(12) United States Patent
Roberge et al.

(10) Patent No.: US 9,725,254 B2
(45) Date of Patent: Aug. 8, 2017

(54) CONFIGURATIONS OF INLET AND OUTLETS OF AIR FILLED AUXILIARY TANK OF AIR SEEDERS

(71) Applicant: CNH Industrial Canada, Ltd., Saskatoon (CA)

(72) Inventors: Martin J. Roberge, Saskatoon (CA); Graham Douglas Stuart, Glaslyn (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 149 days.

(21) Appl. No.: 14/464,821

(22) Filed: Aug. 21, 2014

(65) Prior Publication Data

US 2016/0050843 A1 Feb. 25, 2016

(51) Int. Cl.
| | | |
|---|---|---|
| A01C 15/00 | (2006.01) | |
| B65G 53/16 | (2006.01) | |
| B65G 53/10 | (2006.01) | |
| B65G 53/60 | (2006.01) | |
| B65G 69/04 | (2006.01) | |

(52) U.S. Cl.
CPC ............ *B65G 53/16* (2013.01); *A01C 15/003* (2013.01); *A01C 15/006* (2013.01); *B65G 53/10* (2013.01); *B65G 69/0491* (2013.01); *B65G 53/60* (2013.01)

(58) Field of Classification Search
CPC ..... A01C 15/003; A01C 15/00; A01C 15/006; A01C 7/084; A01C 15/005; A01C 7/081; A01C 7/08; A01C 7/00; B65G 53/16; B65G 53/04; B65G 53/00; B65G 53/10; B65G 53/06; B65G 69/0491; B65G 69/04; B65G 69/00; B65G 53/60; B65G 53/34
See application file for complete search history.

(56) References Cited

U.S. PATENT DOCUMENTS

| | | |
|---|---|---|
| 5,161,473 A | 11/1992 | Landphair et al. |
| 5,830,271 A | 11/1998 | Kohno et al. |
| 6,003,741 A | 12/1999 | Morin et al. |
| 6,298,797 B1 | 10/2001 | Mayerle et al. |
| 6,668,738 B2 | 12/2003 | Lee et al. |
| 7,162,962 B2 | 1/2007 | Fuessel et al. |

(Continued)

FOREIGN PATENT DOCUMENTS

AU 2010200082 A1 7/2010

OTHER PUBLICATIONS

"An Investigation of Air Seeder Component Characteristics", R.K. Allam, P. Eng. E. and H. Wiens, P.Eng., American Society of Agricultural Engineers (15 pages).

*Primary Examiner* — Christopher J Novosad
(74) *Attorney, Agent, or Firm* — Rebecca L. Henkel; Rickard K. DeMille

(57) ABSTRACT

A system for replenishing the supply of a particulate agricultural product in the tank of an air cart. A mixture of air and product comes out of a venturi delivery system and enters in a multiplicity of inlet hoses. Then the product enters into inlet tubes of various lengths and release angles from which product particles are gently spread strategically forming a pile that is more or less horizontal to ensure even feeding of meters during dispensing operations. Then the air exits through one or more fine screens to avoid product escaping as well and is conveyed through the exhaust hoses until reaching an air diffuser. The air diffuser has a series of varying size holes or louvers at the bottom so the air can come out at a uniform low velocity which minimizes any discomfort to nearby operators.

10 Claims, 7 Drawing Sheets

(56) References Cited

U.S. PATENT DOCUMENTS

| | | |
|---|---|---|
| 7,905,050 B2 | 3/2011 | Hunter et al. |
| 8,534,208 B2 | 9/2013 | Georgison et al. |
| 2012/0230779 A1 | 9/2012 | Dunstan |

CONFIGURATIONS OF INLET AND OUTLETS OF AIR FILLED AUXILIARY TANK OF AIR SEEDERS

BACKGROUND OF THE INVENTION

1. Field of the Invention

The present invention relates to farm implements and, more particularly, to an air conveying apparatus for replenishing particulate material such as seed, fertilizer, herbicide or insecticide in one or more tanks of an air seeder. The invention may be used with other farm implements such as planters or fertilizer application equipment.

2. Description of the Related Art

Air seeder systems include a traction unit with an air cart in tow and frequently include a third unit such as a cultivator either intermediate the traction unit and air cart or towed behind the air cart. Agricultural implements that employ an air seeder system to apply seed, fertilizer, or other particulate material, either sub-surface or to the surface of a farm field, typically have a material supply source such as one or more tanks that are loaded with the particulate material. The tanks have or are associated with a metering device, which typically consists of a rotating element, which meters the particulate material from the tanks into a set of distribution channels, such as conduits, hoses, etc., for application to the farm field. In most systems, a pneumatic source such as a fan or blower provides air to convey and distribute material through the distribution channels. Periodically, the tank's supply of particulate material must be replenished. Typically, a screw auger or belt conveyor feeds the material from a source such as a supply vehicle to the tank. Grain augers, conveyor belts and similar mechanical seed handling equipment may cause damage to certain types of seeds. The conveying of canola seeds in particular is a delicate process. Seeds are expensive and physical damage to seeds may affect their germination and germination rate, thus, damage to the seeds while filling the tanks should be minimized.

A departure from these mechanical seed handling techniques is shown in U.S. patent application Ser. No. 14/301,717 filed Jun. 11, 2014. The technique disclosed therein employs an air conveying system where an air flow, either from the air cart fan or from a dedicated pneumatic source, is supplied to a material reservoir, such as a seed hopper, where that air flow passes through one or more restrictions to create a region of increased air velocity and reduced air pressure and a so-called venturi effect. The venturi effect essentially creates a suction effect to minimize the contact friction of particles against the bottom portions of the hose and for ingesting as many particles as possible of agricultural material from the hopper providing an air entrained flow of material. This air flow and material particles are conveyed to the tank where the material is deposited and excess air vented. The air conveying systems significantly reduce seed damage, however the potential for damage to seeds and other fragile agricultural products remains. Moreover, the products tend to accumulate more in some tank areas than others resulting in a non-uniform product distribution and corresponding non-uniformity of product delivery to the metering system.

What is needed in the art is a gentile yet efficient product handling system for fragile materials.

SUMMARY OF THE INVENTION

The present invention provides an agricultural product air conveyor system which minimizes product damage and distributes the product more uniformly within the tank.

The invention in one form is directed to a method of replenishing the supply of a particulate agricultural material in the tank of a pneumatic agricultural material delivery system which includes the steps of supplying air from an air flow source to a hopper or other agricultural material reservoir and passing the supplied air through a restriction to create a region of increased air velocity and reduced air pressure for ingesting agricultural material from the reservoir creating an air entrained flow of material. The flow of air entrained material is conveyed to the tank and gently released from multiple spaced apart locations within the tank to provide a more uniform distribution of material within the tank. Excess air is vented from near the top of the tank to maximize the seed volume without exhausting seeds from the outlet of the tank.

The invention in another form is directed to an air cart which has a pneumatic source for supplying a flow of air entrained agricultural product from a cart product tank to be applied by a utilization implement to an agricultural field. The air cart includes an air system for supplying product to the cart tank. The product supply system has an air supply and at least one elongated conduit with an inlet near one end for occasionally receiving product from a product supply source and multiple spaced apart outlets within the tank for delivering product to the tank. A venturi box has an air inlet for receiving air flow from the air supply and an outlet coupled to the conduit one end for providing a region of reduced air pressure to draw product from the supply source into an air flow. There is also an exhaust air system for venting excess air from the tank which has an inlet near the top of the tank.

In a further form of the invention, a pneumatic agricultural product delivery system has at least one product supply tank, a pneumatic source, and a plenum normally receiving air flow from the pneumatic source. There is a metering system for supplying product from the supply tank and a plurality of distribution lines which extend from plenum outlets to a utilization implement for applying air entrained product to an agricultural field. There is an air conveying system for occasionally receiving product from a supply source and delivering product to the tank to replenish the product supply in the tank. The air conveying system includes an air flow source. There is a venturi box having an inlet and at least one venturi coupled to the air flow source, an inlet for receiving product from the supply source, and an outlet for providing product from the supply source entrained within air flow from the pneumatic source. A plurality of supply conduits receive an air entrained product flow from the venturi box outlet and deliver the air entrained product flow to the product supply tank. Each conduit extends into the product supply tank for releasing the air entrained product flow and at least two conduits release their respective air entrained product flows at different locations within the tank.

An advantage of the present invention is a more uniform distribution of product within a tank and resulting more uniform feeding of product to multiple metering devices.

Another advantage is a reduction in damage to fragile agricultural products during a tank filling operation.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
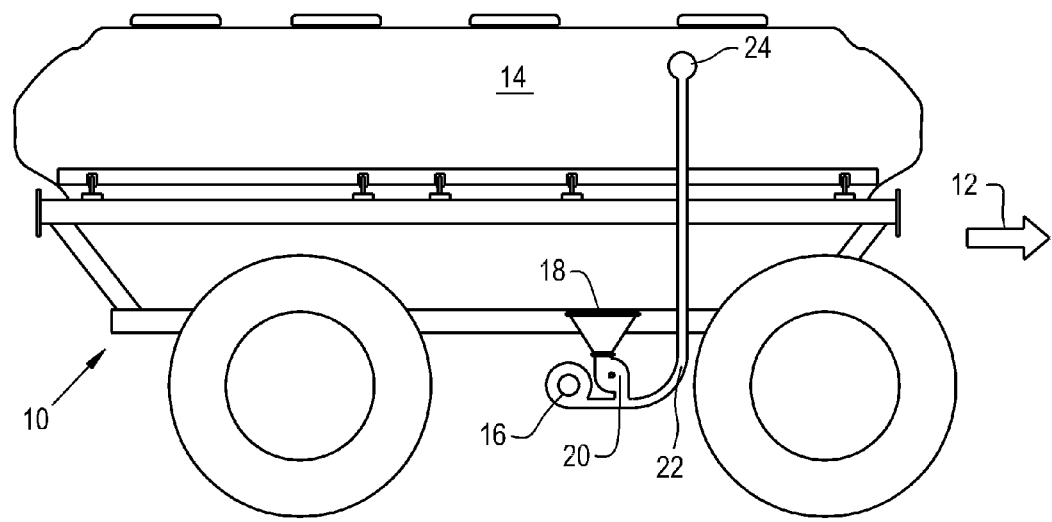
FIG. 1 is a side view of an air cart part of an air seeder equipment, and may include an air conveying system for filling and refilling the cart tank according to the present invention.
Figure 2:
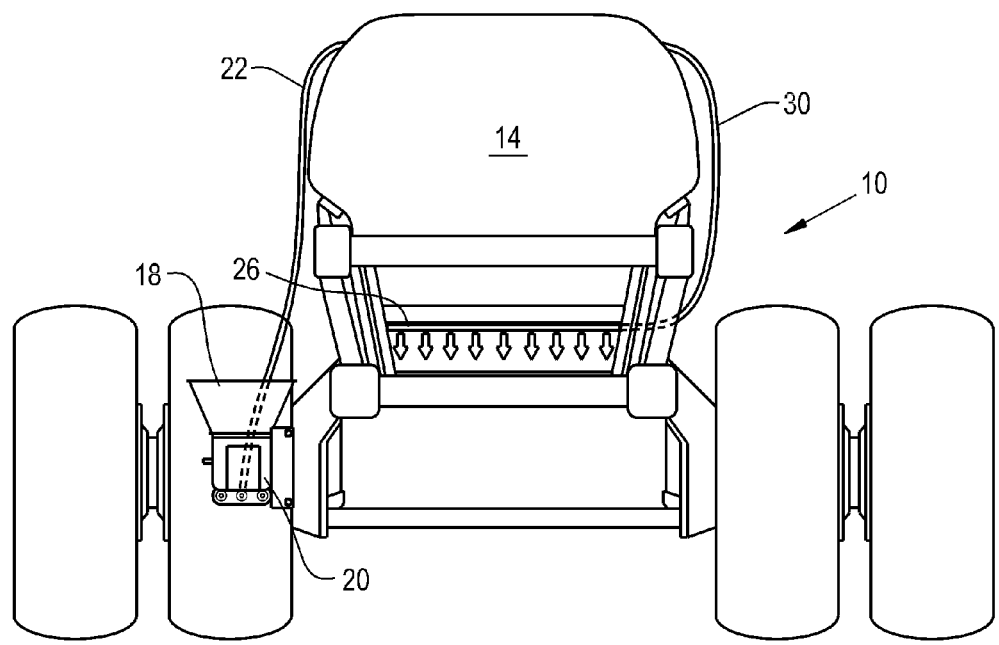
FIG. 2 is a front view of an air cart showing the air conveying system of FIG. 1 and an exhaust air diffuser.

Referring now to the drawings, and more particularly to FIGS. 1 and 2, there is shown an air cart 10 comprising a portion of a known pneumatic agricultural product delivery system which generally includes a traction unit (not shown) which may be coupled to air cart 10 for towing the air cart 10 in the direction of arrow 12. The system usually includes as a third unit, a utilization implement such as an air drill (not shown) for a seeding, cultivating and/or fertilizing operation. As is known in the art, the air cart 10 has one or multiple large product supply tanks 14 which store a certain quantity of the agricultural product, typically a particulate material, e.g., seed and/or inoculant, or fertilizer, and a metering system that meters the particulate material from the tank or tanks 14 to the air drill. In addition to being mechanically linked with the air drill, the air cart 10 and the air drill are interconnected by an air/product delivery system which includes a plurality of distribution lines. Air is supplied to the product delivery system by a fan assembly or other pneumatic source sometimes mounted adjacent the front of the tank 14 and near the metering unit. Alternately, the fan assembly may be mounted rearward of the tank or adjacent a side of the tank. As known in the art, the fan creates a turbulent air flow that carries particulate material metered by metering system into and along air/product distribution lines to the utilization implement for applying the air entrained product to an agricultural field.

Figure 4:
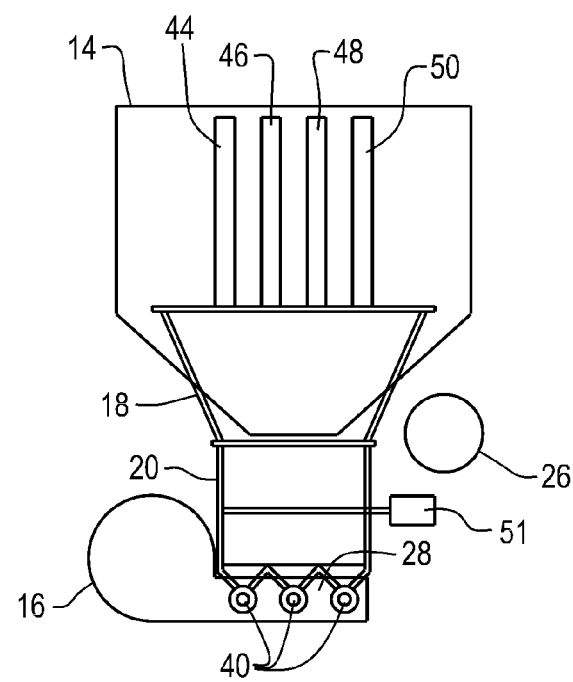
FIG. 4 is a schematic cross-sectional representation of the product supply system of FIG. 3 from the left side thereof.

The supply of particulate material in the tank 14 is occasionally replenished from a supply vehicle. In the past the tanks have been refilled by auger or conveyor systems which may cause damage to fragile materials. As shown in the aforementioned Ser. No. 14/301,717 application, these mechanisms have been improved upon by an air material delivery system employing an air flow source such as a dedicated fan 16 and motor. The supply of particulate material in the cart tank 14 is replenished from a hopper 18 which receives material, for example, by gravity flow, from a supply source such as a truck or other delivery vehicle. The material passes through a rotary feeder and air lock mechanism 20, and passes upwardly through hose 22 and, from tank inlet 24, into the tank 14. The front end view of FIG. 2 includes an exhaust air diffuser 26 to be discussed later. When the material in tank 14 requires replenishing, a supply source such as the agricultural material reservoir or hopper 18 provides, by way of an air lock 20, a material flow to be mixed with the air passing into the venturi region 28 (FIG. 4). The air entrained material is then conveyed by conduit 22 from a venturi region outlet to replenish the material in the tank 14. The material particles settle in the tank and exhaust air flows through conduit 30 to the diffuser 26.

Figure 3:
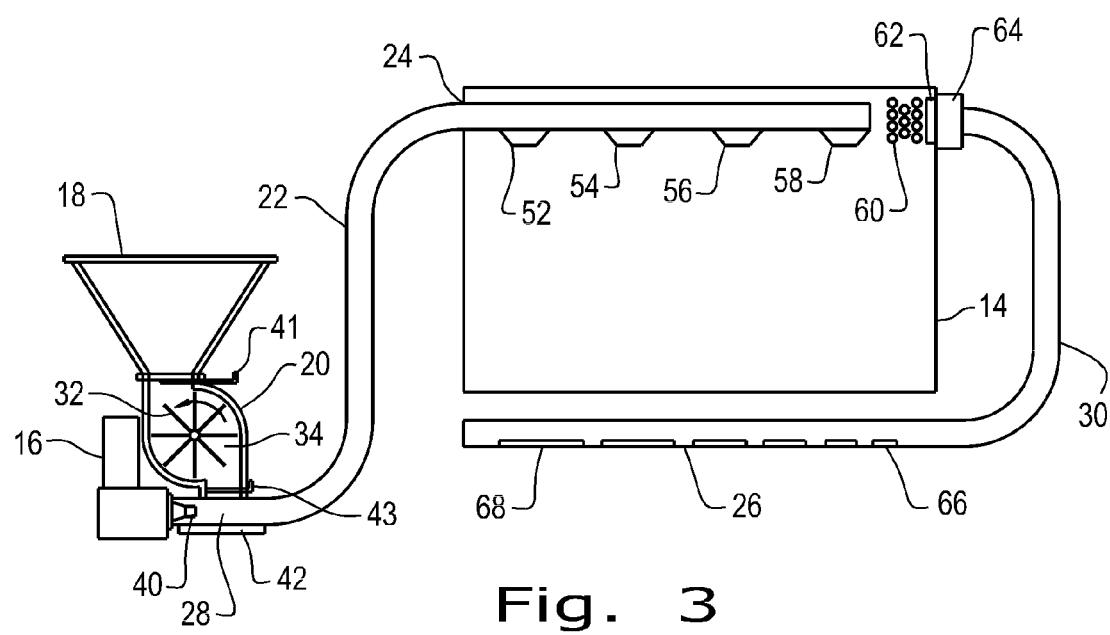
FIG. 3 is a schematic cross-sectional representation of a product supply system incorporation the invention in one form.

FIGS. 3 and 4 illustrate some details of the rotary feeder and air lock 20 and venturi region 28. The rotary feeder and air lock portion has a cylinder 32 rotatable about an axis 49 (FIG. 8) in a counter-clockwise direction as shown by the arrow in FIG. 3. The cylinder 32 has a plurality of wedge-shaped pockets such as 34 which take on product from the hopper 18 when opening upwardly and release product downwardly into the venturi region after about one-half revolution. The cylinder fits within cylindrical sidewalls sufficiently closely to prevent any significant air passage. At around a five o'clock position, the material falls from the wedge shaped segments and is funneled by seed ramps into the venturi region 28 below.

Figure 5:
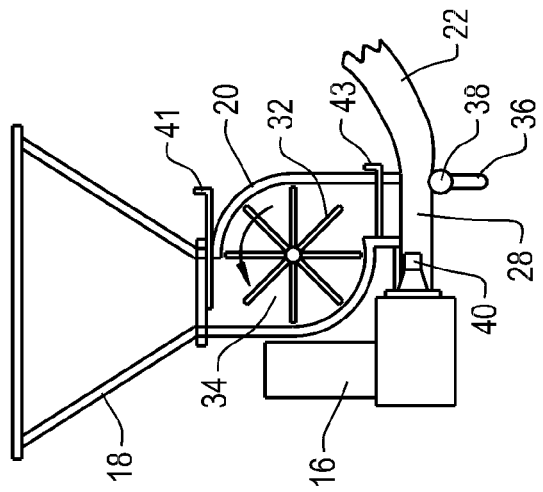
FIG. 5 is a schematic cross-sectional representation of the air lock, fan and hopper portions of the product supply system of FIGS. 3 and 4 showing a control valve in the tank filling position.
Figure 6:
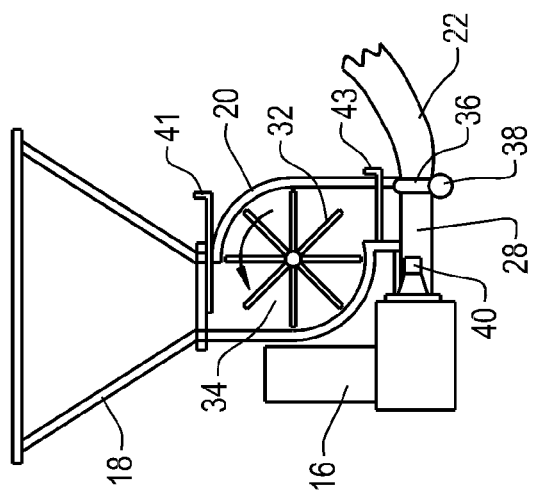
FIG. 6 is a schematic cross-sectional representation similar to FIG. 5, but showing the control valve in the tank sealed position.
Figure 7:
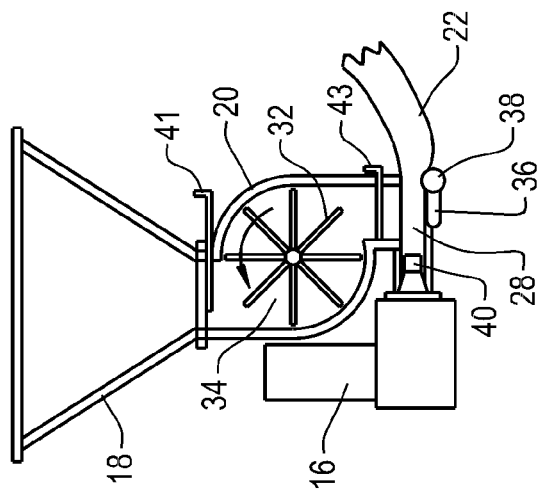
FIG. 7 is a schematic cross-sectional representation similar to FIGS. 5 and 6, but showing the control valve in a position to drain agricultural product from the entire tank filling system.

It is important to be able to purge the tank filling system, for example, prior to an extended period of non-use or preparatory to utilizing the air cart with a different agricultural product. A valve 36 is pivotable about a pivot 38 from the horizontal or 9 o'clock position of FIG. 5 clockwise to the 12 o'clock position of FIG. 6. FIG. 5 shows the valve in the normal tank filling position where air flow from the venturi nozzle 40 joins with agricultural material from the hopper 18 and proceeds through the conduit 22 to the tank inlet. The valve may also assume this position during normal product distribution to maintain the tank pressurized and aid material flow. When moved to the location shown in FIG. 6, the conduit 22 is blocked and material is free to fall from the venturi region 28 emptying the hopper. Both the hopper and the conduit 22 may be emptied by moving the valve to the position illustrated in FIG. 7. Returning to FIG. 3, this last feature may also be achieved by a simple drop floor 42 which may be opened to purge both the hopper 14 and the conduit 22. A pair of slide valves 41 and 43 may optionally be included. Valve 41 is operable to isolate the hopper 14 from the air lock 20 while valve 43 provides a similar function between the air lock and the venturi region 28.

Figure 8:
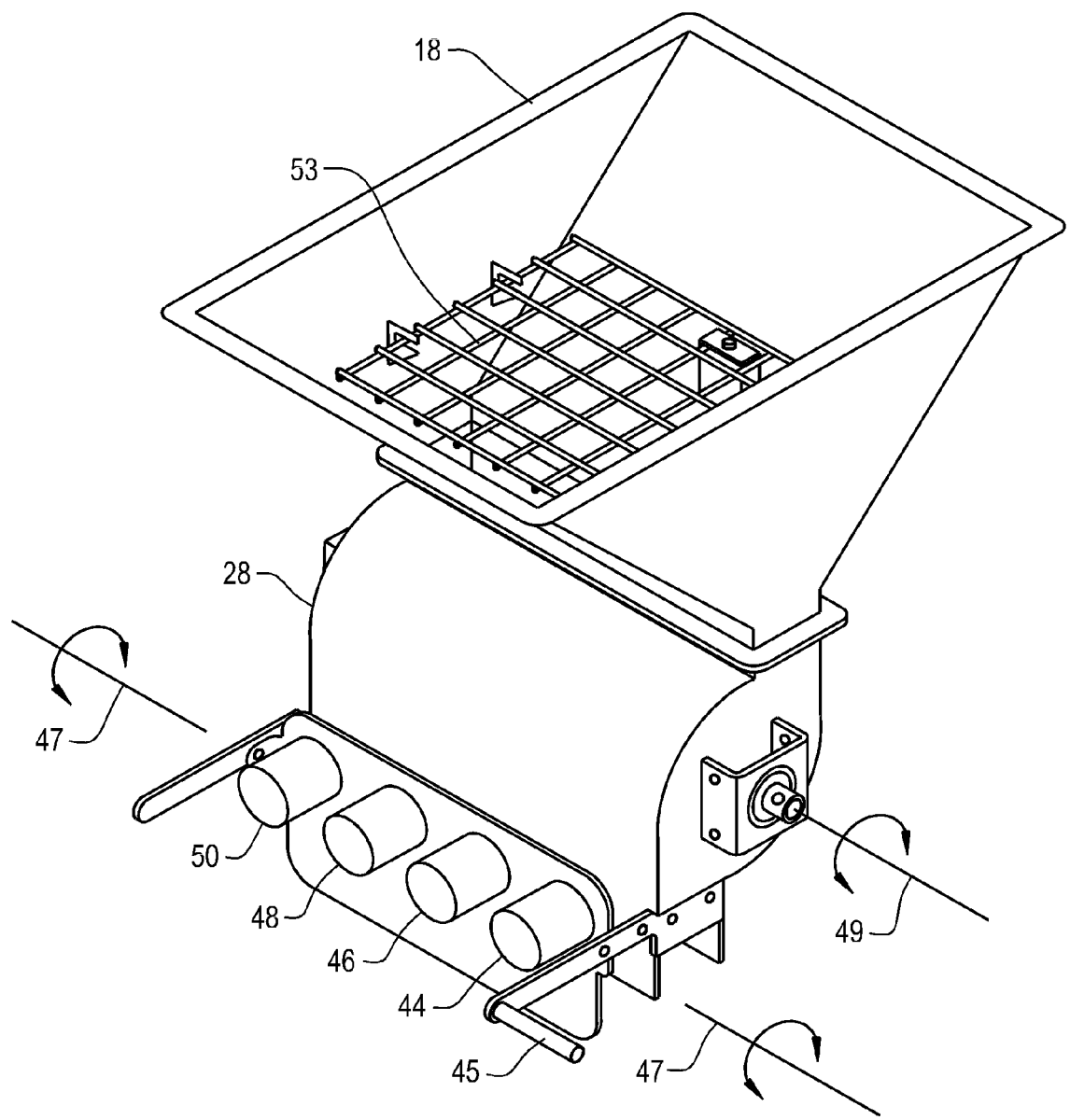
FIG. 8 is an isometric view of the air lock, fan and hopper portions of the product supply system with the control valve in the tank filling position of FIG. 5.

In FIG. 8, lever 45 is shown in the fill position corresponding to the FIG. 5 fill position of valve 36. Rotation by ninety degrees clockwise about axis 47 moves the valve to the drain condition of FIG.7 while rotation by ninety degrees counter-clockwise moves the valve to the tank sealed condition of FIG.6. The motor 51 of FIG. 4 is for driving the air lock cylinder about its axis 49 in the sense indicated by the arrow. A grid 53 may be included to prevent large objects from passing down the hopper and into the air lock.

With an air conveying system, there is a need for an improved configuration of a multiplicity of inlet and outlet hoses to convey product and air into the tank and to exhaust excess air properly from the tank into an air diffuser (or back into the air cart). In FIGS. 3 and 4, the conduit 22 actually includes four separate inlet hoses or tubes 44, 46, 48 or 50 which extend into the tank four different distances each terminating in a downwardly directed nozzle 52, 54, 56 or 58. The tubes extend into the tank different distances so that product is released from the nozzles at multiple spaced apart locations within the tank. This provides a fairly uniform distribution of product in the tank.

At the tank outlet is a porous media grid such as a set of staggered parallel cylindrical rods 60 to minimize the probability of canola seeds or other product from reaching a vertical sieve or screen 62. Rods 60 may be staggered or offset vertically and may be bolted or otherwise fixed to the tank ceiling. Perforated plates could also be employed. A rotary valve 64 selectively allows or prevents air from exiting the tank. Closing this valve pressurizes the tank and aids the normal product distribution process while opening the valve facilitates air egress while refilling the tank. The valve may have brushes on the perimeter which rub against the screen thereby cleaning the screen each time the valve is opened or closed. The valve could be located lower closer to the air diffuser where it would be easier to reach by the operator.

When open, valve 64 vents exhaust air from the tank by way of conduit 30 to the diffuser 26 beneath the cart. A smooth and uniform air release is achieved through gradually larger openings along the bottom of the diffuser with the smallest opening 66 closest to the connection with the exhaust air conduit 30 where the air pressure is highest and the largest opening 68 most remote from the conduit 30.

Figure 9:
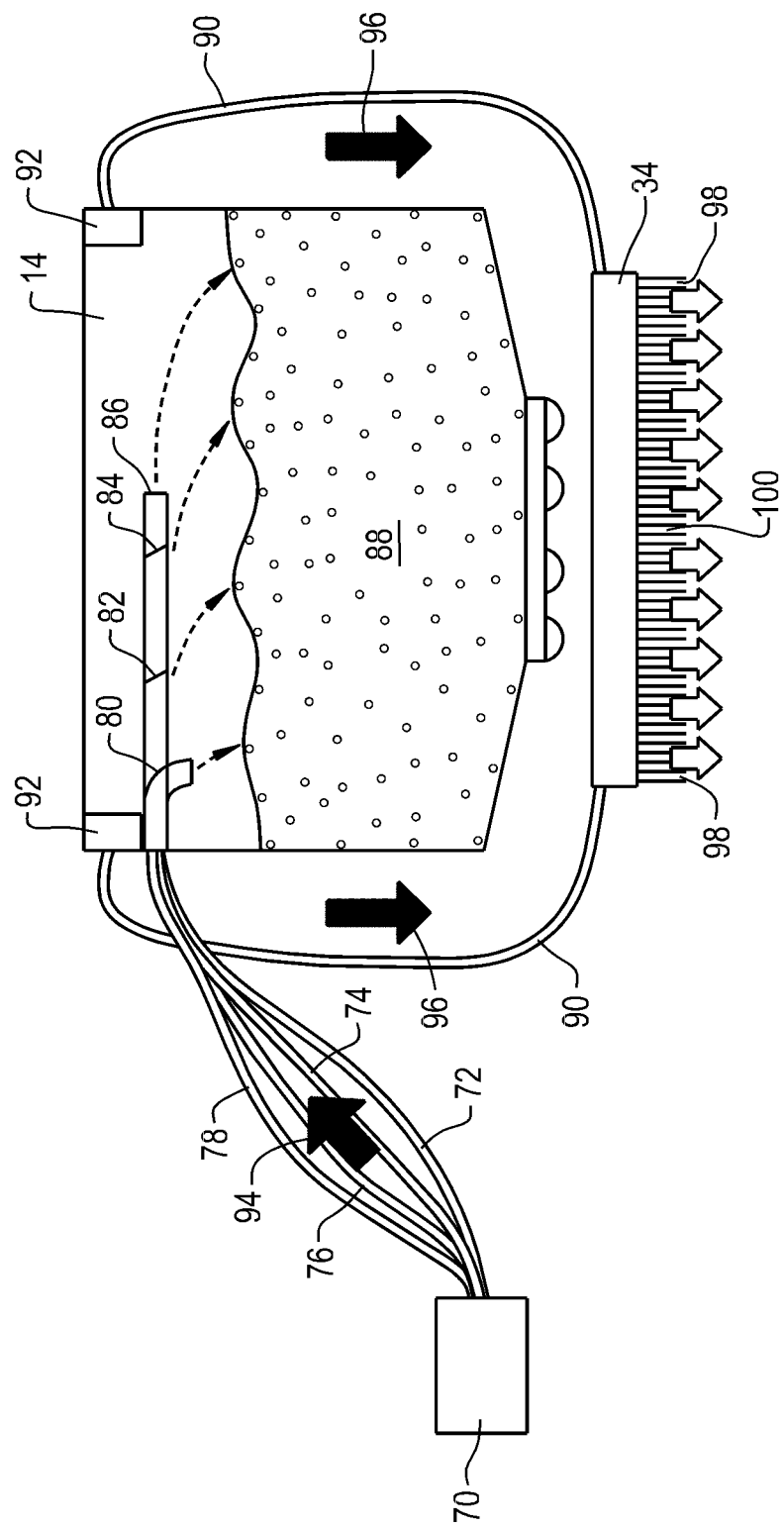
FIG. 9 is a schematic cross-sectional representation of a pneumatic agricultural product delivery system incorporation the invention in another form.

FIG. 9 illustrates some variations on a system for gently replenishing the material supply in a tank and returning exhaust air from the tank. The venturi box 70 provides an air entrained flow of agricultural product to inlet hoses 72, 74, 76 and 78 which are coupled with inlet tubes 80, 82, 84 and 86 within the tank 14. An inlet hose and tube pair such as 72 and 80 function as a supply conduit for conveying product from the venturi box to the tank 14. In FIG. 9, the tubes 80, 82, 84, and 86 extend into the tank different distances so that product is released from the respective tube ends at multiple spaced apart locations within the tank.

Moreover, some tubes such as 86 release product in a generally horizontal direction while others such as 80 are directed obliquely downward. This multiple outlet array provides a more uniform distribution of product 88 within the tank than is achieved from a single outlet. The uniform distribution, in turn, contributes to a more uniform distributing of product through multiple product meters to multiple distribution lines. Excess air is vented from the tank through one or more exhaust system conduits or tubes 90 which have screen 92 covered slots or other exhaust apertures. The screen 92 mesh is sized to help prevent seed or other product from escaping form the tank with the exhaust air.

In FIG. 9, the air entrained flow of material is conveyed to the tank as shown by arrow 94 and the flow of air entrained material is released from multiple spaced apart locations within the tank to provide a more uniform distribution of material within the tank. The excess air from the tank is vented from a location above the inlet tubes 80, 82, 84 and 86 by sieving the excess air through a screen 92 to minimize the egress of agricultural product from the tank. Excess air is vented from the tank as shown by arrow 96 and vented downward to an air diffuser 34 beneath the tank as in FIG. 3. The diffuser of FIG. 9 receives exhaust air at each end and the diffuser vents may be uniform as shown, however, smallest diffuser vents 98 may be located closest to the exhaust lines 90 and larger vents 100 nearer the diffuser center to provide a more uniform exhaust distribution. When the exhaust air is diffused in this way operator exposure to undesirable chemicals or other remaining particles is minimized.

Figure 10:
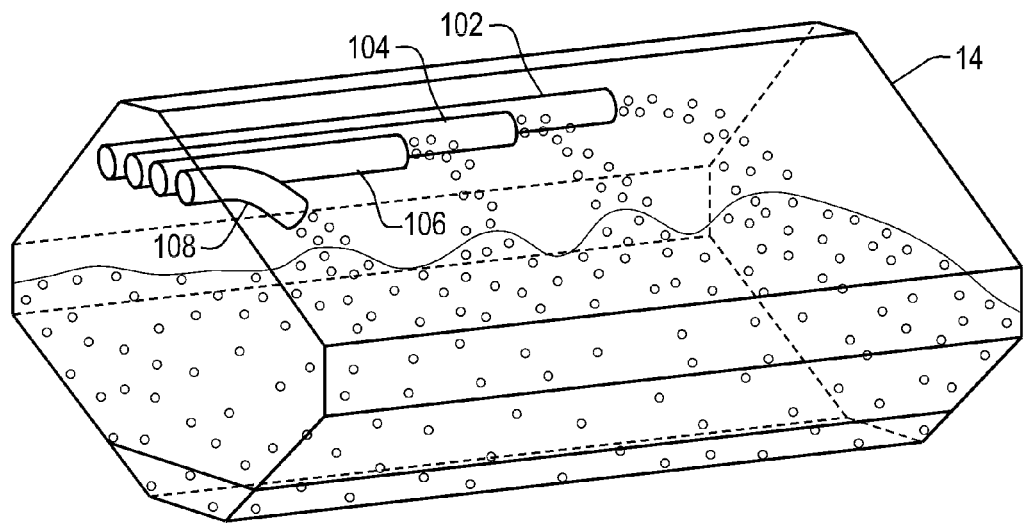
FIG. 10 is an isometric view of an air cart tank with air conveying nozzles visible therein.

FIG. 10 illustrates one of many further possible configurations for the present invention. The tank 14 is shown in phantom with the interior components visible. The inlet tubes 102, 104, 106 and 108 extend various lateral distances into the tank and are also spaced longitudinally (front to rear of the tank) from one another. Further the open tube ends may be variously shaped or louvered to direct material flow downwardly at various angles relative to vertical. The shortest tube 108 is directed obliquely downward while the other tubes release their product in a generally horizontal direction. This configuration results in a product pattern which accumulates first near the tank end remote from the inlet as illustrated.

Figure 11:
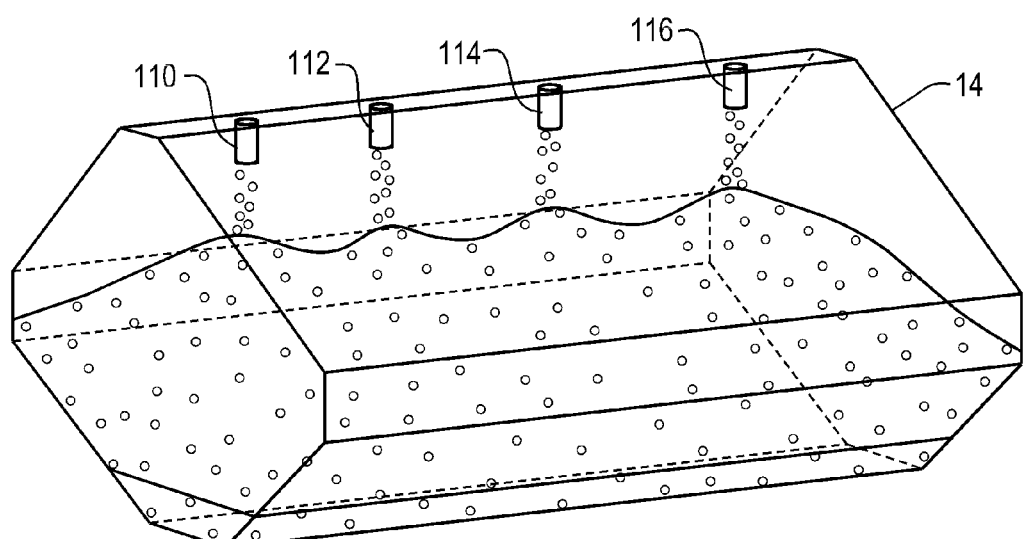
FIG. 11 is an isometric view of an air cart tank similar to FIG. 10, but with alternative air conveying nozzles visible therein.
Figure 12:
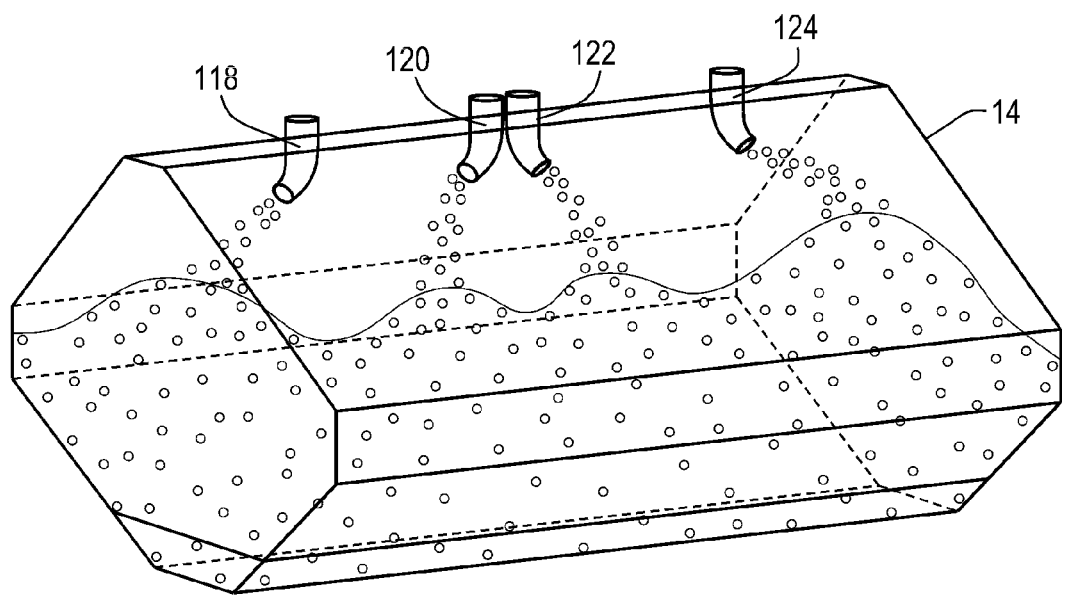
FIG. 12 is an isometric view of an air cart tank similar to FIGS. 10 and 11, but with a further variation on the air conveying nozzles visible therein.

A more horizontal layer of product is achieved by the inlet arrangement shown in FIG. 11. All four nozzles 110, 112,114 and 116 are directed vertically downward at intervals spaced laterally across the tank 14. FIG. 12 illustrates a technique for accumulating product more quickly near the outboard ends of the tank. Here the central pair of nozzles 120 and 122 are directed somewhat obliquely away from one another as are the laterally outboard nozzles 118 and 124. The number of outlets or nozzles as well as their location and direction may be deployed in various other ways to achieve any desired product accumulation pattern.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A pneumatic agricultural product delivery system, comprising:
   at least one product supply tank;
   a pneumatic source;
   a plenum normally receiving air flow from the pneumatic source and having a plurality of outlets;
   a plurality of distribution lines extending from the plenum outlets to a utilization implement for applying air entrained product to an agricultural field;
   a metering system for supplying product from the least one product supply tank to the distribution lines; and
   an air conveying system for receiving product from a supply source and delivering product to the at least one product supply tank to replenish the product supply in the at least one product supply tank, comprising;
   an air flow source;
   a venturi region having an inlet and at least one venturi coupled to the air flow source, an inlet for receiving product from the supply source, and an outlet for providing product from the supply source entrained within air flow from the pneumatic source; and a plurality of supply conduits for receiving an air entrained product flow from the venturi region outlet and delivering the air entrained product flow to the at least one product supply tank, each supply conduit extending into the at least one product supply tank for releasing the air entrained product flow, at least two supply conduits releasing their respective air entrained product flows at different locations within the at least one product supply tank, wherein each supply conduit extends into the at least one product supply tank a distance different from the distance any other supply conduit extends into the at least one product supply tank.

2. The product delivery system of claim 1, wherein at least one supply conduit releases air entrained product flow received from the venturi region outlet at an oblique angle relative to vertical.

3. The product delivery system of claim 1, further comprising an air exhaust system for venting excess air from the at least one product supply tank, the air exhaust system having at least one inlet and an outlet.

4. The product delivery system of claim 3, wherein the air exhaust system outlet comprises a diffuser having multiple openings allowing air to escape at a relatively reduced velocity.

5. The product delivery system of claim 4, wherein the multiple openings vary in size to distribute the exhaust air exiting the diffuser.

6. The product delivery system of claim 3, further comprising a screen system covering the exhaust air inlet having a screen mesh sized to prevent the egress of agricultural product from the at least one product supply tank.

7. The product delivery system of claim 6, wherein the exhaust system inlet includes a rotary valve for closing the exhaust system and preventing the egress of air from the at least one product supply tank and a brush for engaging the screen system to scrub particulate material from the screen system each time the rotary valve is actuated.

8. The product delivery system of claim 3, wherein the at least one inlet of the air exhaust system includes a valve for closing the exhaust system and preventing the egress of air from the at least one product supply tank.

9. A pneumatic agricultural product delivery system, comprising:

at least one product supply tank;

a pneumatic source;

a plenum normally receiving air flow from the pneumatic source and having a plurality of outlets;

a plurality of distribution lines extending from the plenum outlets to a utilization implement for applying air entrained product to an agricultural field;

a metering system for supplying product from the least one product supply tank to the distribution lines; and an air conveying system for receiving product from a supply source and delivering product to the at least one product supply tank to replenish the product supply in the at least one product supply tank, comprising;

an air flow source;

a venturi region having an inlet and at least one venturi coupled to the air flow source, an inlet for receiving product from the supply source, and an outlet for providing product from the supply source entrained within air flow from the pneumatic source; and a plurality of supply conduits for receiving an air entrained product flow from the venturi region outlet and delivering the air entrained product flow to the at least one product supply tank, each supply conduit extending into the at least one product supply tank for releasing the air entrained product flow, at least two supply conduits releasing their respective air entrained product flows at different locations within the at least one product supply tank, wherein at least two supply conduits release their respective air entrained product flows at different angles relative to vertical.

10. A pneumatic agricultural product delivery system, comprising:

at least one product supply tank;

a pneumatic source;

a plenum normally receiving air flow from the pneumatic source and having a plurality of outlets;

a plurality of distribution lines extending from the plenum outlets to a utilization implement for applying air entrained product to an agricultural field;

a metering system for supplying product from the least one product supply tank to the distribution lines;

an air conveying system for receiving product from a supply source and delivering product to the at least one product supply tank to replenish the product supply in the at least one product supply tank, comprising;

an air flow source;

a venturi region having an inlet and at least one venturi coupled to the air flow source, an inlet for receiving product from the supply source, and an outlet for providing product from the supply source entrained within air flow from the pneumatic source; and a plurality of supply conduits for receiving an air entrained product flow from the venturi region outlet and delivering the air entrained product flow to the at least one product supply tank, each supply conduit extending into the at least one product supply tank for releasing the air entrained product flow, at least two supply conduits releasing their respective air entrained product flows at different locations within the at least one product supply tank; and a three position valve located in the venturi region and operable in a first position to drain product from the supply source only, in a second position to drain product from both the supply source and the venturi region outlet, and in a third position to pressurize the at least one product supply tank.

* * * * *